UNITED STATES PATENT OFFICE.

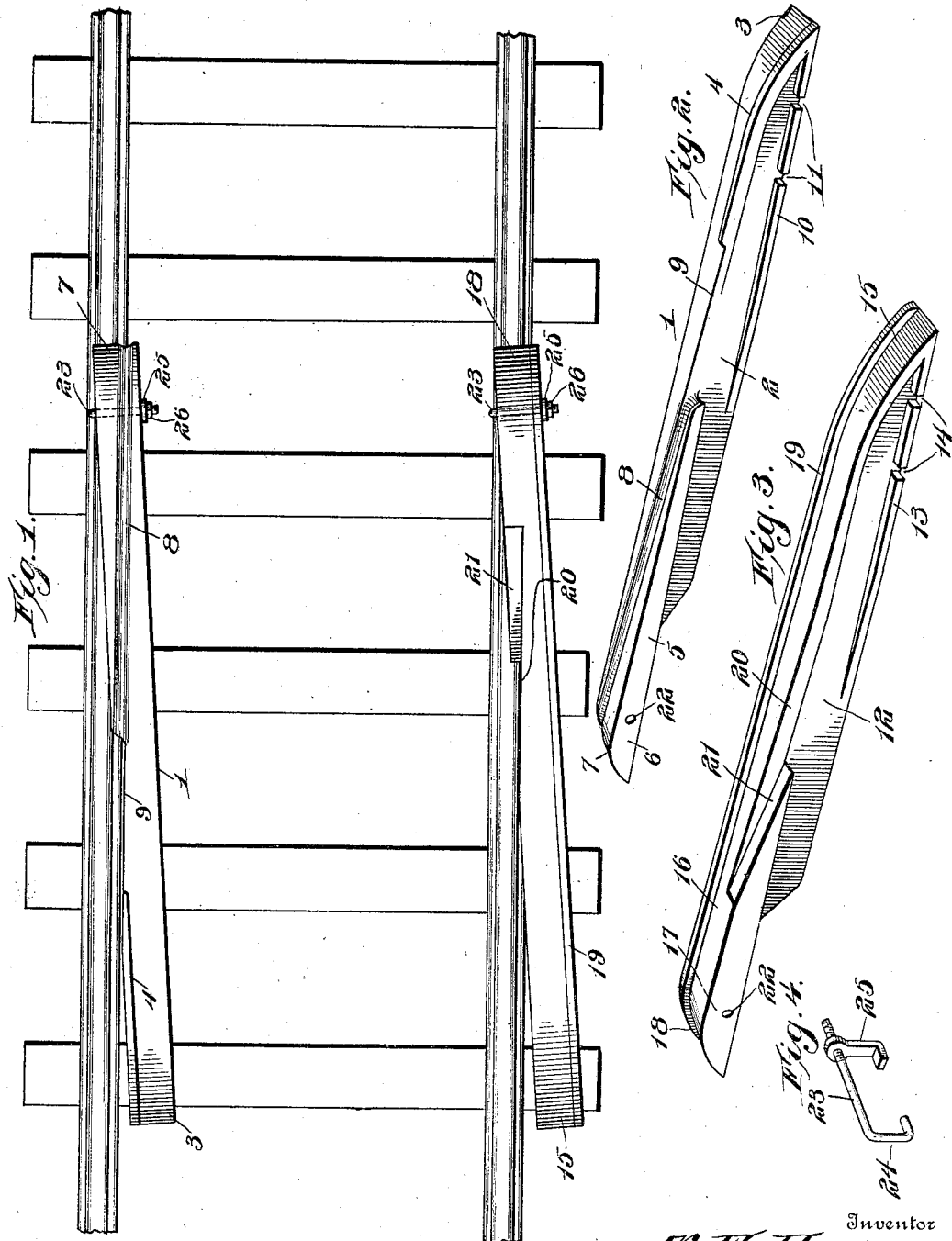

NICOLAS F. HESS, OF ATCHISON, KANSAS.

CAR-REPLACER.

No. 828,112.  Specification of Letters Patent.  Patented Aug. 7, 1906.

Application filed April 18, 1906. Serial No. 312,432.

*To all whom it may concern:*

Be it known that I, NICOLAS F. HESS, a citizen of the United States, residing at Atchison, in the county of Atchison and State of Kansas, have invented new and useful Improvements in Car-Replacers, of which the following is a specification.

The invention relates to an improvement in car-replacers designed primarily for emergency use to replace truck-wheels of a car or engine in proper position on the rails.

The main object of the present invention is the production of a car-replacer for use with each track-rail and of individual construction to provide for effectively elevating the displaced truck-wheels and guide the same in proper position on the track.

The invention will be described in the following specification, reference being had particularly to the accompanying drawings, in which—

Figure 1 is a plan of a section of the track, illustrating the application of my improved car-replacer. Fig. 2 is a perspective of the replacer for use with the left rail. Fig. 3 is a perspective of the replacer for use with the right rail. Fig. 4 is a perspective of the securing means for the rail end of the replacers.

It will be noted that the replacers are of distinctly different types, being designed for use with the respective track-rails.

The replacer 1, designed for use with the left rail, comprises a body portion 2 of plain or straight formation on its lower edge to rest upon the ties of the track and gradually reduced in thickness from the rear toward the forward end to provide for arranging the replacer at an angle to the rail with the forward ends of the body portion in contact therewith. By preference the reduction in width of the body portion is produced by inclining the side next the rail relative to the opposite side, so that the forward end of the body portion is, in effect, a relatively narrow or pointed edge. The tread portion of the replacer curves upwardly and forwardly at the rear end, as at 3, from the plane of the lower edge of the replacer to a point approximately on a level with the track-rail, the edge of the tread portion next the rail being provided for a short distance with a vertically-arranged flange 4. The tread portion of the replacer is projected forwardly beyond the body portion in the form of a forwardly-projecting lip 5, which is coextensive in width with the normal width of the tread portion and of increased thickness near its forward end, as at 6, the extreme forward end of said lip curving forwardly and downwardly, at 7, so as to gradually coincide with the tread of the rail proper. A groove 8 is formed in the lip 5 of the replacer, extending at an incline to the side edges thereof, being formed to provide a depression which in the use of the replacer extends approximately parallel with the tread portion of the rail. The rear end of the groove 8 is thus disposed on the inner side of the replacer—that is, the side next the rail—and by virtue of the overhanging of the lip relative to this body the rear end of the groove is open to provide for the ready entrance of the wheel-flange, as hereinafter described. The tread portion of the replacer is reduced in width adjacent the rear end of the groove and is gradually widened therefrom to the forward end of the flange 4, as at 9. At the lower edges of the rear end of the body portion 2 the replacer is provided with laterally-extending flanges, as at 10, in which are formed suitable notches 11 for spiking purposes, as will later appear. As thus constructed the left replacer, hereinafter termed the "inside" replacer, is provided with a tread portion formed on a curve at its rear end to coincide with the lower edge of the replacer and projected in the form of a forwardly and laterally extending lip at the forward end, the tread portion being formed with a relatively short flange adjacent its rear end and with an angularly-arranged groove extending throughout the length of the lip portion, the tread portion of the replacer being cut away or reduced to provide an entrance to the groove.

The right-hand replacer, hereinafter termed the "outside" replacer, comprises a body portion 12, formed at the lower rear portion with laterally-projecting flanges 13, having spike-notches 14, similar in all respects to the inside replacer. The tread portion of the outside replacer is curved at its rear end forwardly and upwardly, as at 15, and coincides with a lip 16, projecting forwardly from the body portion 2, similar to the lip 5. The forward end of the lip 16 is also relatively thickened at 17 and forwardly and downwardly curved from said thickened portion to coincide with the tread portion of the rail, as at 18. The tread portion of the replacer, which of course includes the lip 16, is formed on the outer edge—that is, the edge remote from the rail when the replacer is in use—with a vertically-extending flange 19, which is coextensive in length with the length of the tread portion and conforms in curvature to the curvature of the respective ends thereof, as previously described. For a portion of the length about intermediate its ends the tread portion of the replacer is reduced in width by cutting away the inner edge on a forward and outward incline, as at 20, and said inclined edge is provided adjacent its forward end with an upwardly and forwardly inclined ledge 21, which at its rear or lower end coincides with the lower edge of the tread portion and at its forward or upper end coincides with the upper surface of the tread portion, all as clearly shown in Fig. 3. As thus constructed, the outside replacer is formed with a tread portion having end curvatures and with an outside flange projecting vertically from said tread portion and extending throughout the length thereof, the inside edge of the tread portion being cut away to provide an inclined portion which when the replacer is in use projects approximately parallel with the rail, said inclined edge being further provided with a ledge forwardly and upwardly inclined and designed in use to overlie the rail proper.

The thickened portions 6 and 17 of the lips 5 and 16 of the respective replacers are formed with transversely-arranged openings 22 for the reception of a clamp-bolt designed to secure the forward ends of the replacers in fixed relation to the rails. The bolt comprises a bar 23, having a hook end 24 to engage beneath the tread portions of the rail on one side thereof, the bar proper projecting through the opening and being threaded at its free end. A hook member 25 is designed for a sliding connection with the free terminal of the rod beyond the replacer, being designed to engage beneath the tread portion of the rail on the side opposite that engaged by the hook 24. A nut 26 is to be secured upon the threaded terminal of the rod 23 beyond the hook 25, so that the rail may be embraced between the hooks 24 and 25, with the effect to hold the forward end of the replacer in fixed relation to the rail.

In use the replacers are secured to the respective rails with the lips 7 and 16 overlying and resting upon the rails, the rear ends of the replacers being arranged at such angle to the rails as to coincide with the path of movement of the displaced wheels. In this position, with the securing-bolts 23 clamping the rails and the rear end of the replacers spiked to the ties, the forward end of the groove 8 of the inside replacer will extend approximately parallel with the rails to which said replacer is secured, its forward end terminating in alinement with the inside edge of the rail. The flange 19 of the outside replacer terminates at its forward end approximately in alinement with the outside edge of the rail to which it is secured, the ledge 21 overlying and resting upon the rail, the rear edge of said ledge terminating, of course, coincidently with the tread-surface of said rail.

It is of course to be understood that the respective replacers are arranged in accordance with the above description—that is, the inside replacer is positioned between the rails, while the outside replacer is positioned outside or beyond the rails. In this position as the displaced wheels ride upon the replacer the tread portion of said wheels between the track or those to travel upon the left-hand track will ride upon the flange 4 of the inside replacer, the flange of the wheel riding upon the tread-surface of the replacer, the incline 3 serving to elevate the wheels approximately to the level of the rail. As the wheels travel forward the flange of the wheel will ride off of the tread-surface of the replacer by reason of the incline 9 and into the groove 8, by which it will be directed into proper position against the inside of the left rail. The tread-surface of the displaced wheel arranged for travel on the right track will ride upon the tread-surface of the outside replacer, the flange 19 preventing any tendency of said wheel to ride off of the replacer. The flange of the wheel will ride between the rail and the proximate edge of the tread-surface of the replacer until meeting the ledge 21, upon which it will travel and move upward and onto the upper surface of the lip 16, which will, by virtue of the position of the forward end of the flange 19, direct said wheel into proper position on the rail. By virtue of the thickened portions 6 and 17 of the respective replacers the wheels are so elevated at this particular point as to avoid contact of the flanges thereof with the retaining-bolts 23.

The respective replacers are intended for use at all times as inside and outside replacers, so that if the wheels are off the track on the right side thereof the replacers will be used as described and the wheels replaced by pulling or forward movement of the car or engine, while should the displaced wheels be off the track to the left side thereof the replacers would be simply reverse in position and the car or engine pushed or backed onto the replacers and onto the track.

It is of course to be understood that each of the replacers is constructed of a single piece of metal capable of resisting the weight of the car or engine and aside from the particular construction hereinabove described may be otherwise constructed as desired in order to provide desired lightness of structure in accordance with the particular use contemplated.

Having thus described the invention, what is claimed as new is—

1. A car-replacer comprising a body portion gradually reduced in thickness in a forward direction, the tread-surface of said body portion being provided with a vertically-projecting flange adjacent one edge thereof and formed with a groove extending at an angle to the side edge of the tread portion and opening at its rear end at one side of the tread portion.

2. A car-replacer comprising a body portion having one side edge inclined in a forward direction, the tread of the body portion being formed with a flange extending for a portion of its length, a lip extending forwardly from the body portion and coinciding with the tread portion thereof, said lip projecting laterally beyond the body portion to overlie and rest upon the track-rail and being formed with a groove extending longitudinally of the lip at an angle to its side edges, the rear end of the groove opening beyond the side edge of the tread portion.

3. A car-replacer comprising a body portion having one side edge inclined in a forward direction, the tread of the body portion being formed with a flange extending for a portion of its length, a lip extending forwardly for a portion of its length, a lip extending forwardly from the body portion and coinciding with the tread portion thereof, said lip projecting laterally beyond the body portion to overlie and rest upon the track-rail and being formed with a groove extending longitudinally of the lip at an angle to its side edges, the rear end of the groove opening beyond the side edge of the tread portion, the forward end of the lip being provided with track-engaging means and shaped to provide a thickened portion in vertical alinement with the track-engaging means.

4. A car-replacer comprising a body portion having one side edge inclined to rest against the track-rail, the tread of said body portion being provided with a flange extending vertically from and coextensive with the outside edge thereof, the inside edge of the tread being cut away on a forwardly and outwardly arranged incline, and a forwardly and upwardly projecting ledge secured to said incline.

5. A car-replacer comprising a body portion having one side edge inclined to rest against the track-rail, the tread of said body portion being provided with a flange extending vertically from and coextensive with the outside edge thereof, the inside edge of the tread being cut away on a forwardly and outwardly arranged incline, and a forwardly and upwardly projecting ledge secured to said incline, the forward end of said ledge coinciding with the tread of the body portion, and the rear end thereof coinciding with the lower surface of the tread portion.

6. A car-replacer comprising a body portion provided at its lower edge with laterally-projecting flanges formed with spike-receiving notches, a lip extending forwardly from the body portion and projecting forwardly and laterally beyond said body portion, the upper surface of the lip coinciding with the tread-surface of the body portion, the outside edge of the lip and body portion being provided with a vertically-projecting flange, and the rear end of the lip being cut away to provide a forwardly and outwardly inclined edge, and a forwardly and upwardly inclined ledge secured to said edge.

7. A track-replacer comprising a body portion and a lip projecting forwardly therefrom and designed to overlie and rest upon the track, track-engaging means coöperating with the forward edge of the lip and designed to overlie and clamp the tread of the rail, said lip adjacent the track-engaging means being thickened to elevate the flange of the wheel above said track-engaging means.

In testimony whereof I affix my signature in presence of two witnesses.

NICOLAS F. HESS.

Witnesses:
J. H. TALBOTT,
EDW. P. PITTS.